United States Patent [19]
Yates

[11] 4,250,069
[45] Feb. 10, 1981

[54] MODIFIED MELAMINE-FORMALDEHYDE CONDENSATION PRODUCTS

[75] Inventor: Raymond W. Yates, Walsall, England

[73] Assignee: British Industrial Plastics, Limited, Manchester, England

[21] Appl. No.: 49,892

[22] Filed: Jun. 19, 1979

[30] Foreign Application Priority Data

Jun. 24, 1978 [GB] United Kingdom ............... 27825/78

[51] Int. Cl.³ ........................ C08G 12/12; C08G 12/32

[52] U.S. Cl. ............................... 260/29.4 R; 162/167; 528/256; 528/262

[58] Field of Search ................... 260/29.4 R; 528/232, 528/256, 262

[56] References Cited

U.S. PATENT DOCUMENTS

| | | | |
|---|---|---|---|
| 2,485,080 | 10/1949 | Wounsiedler et al. | 260/29.4 R |
| 3,721,651 | 3/1973 | Yates | 260/29.4 R |
| 4,119,598 | 10/1978 | Pearson | 260/29.4 R |

FOREIGN PATENT DOCUMENTS

| | | |
|---|---|---|
| 1012319 | 12/1965 | United Kingdom . |
| 1305187 | 1/1973 | United Kingdom . |
| 1317774 | 5/1973 | United Kingdom . |

*Primary Examiner*—Theodore E. Pertilla
*Attorney, Agent, or Firm*—Stevens, Davis, Miller & Mosher

[57] ABSTRACT

Improved resins are obtained by substituting urea for part of the melamine in known cationic water-soluble resins obtained by interaction of melamine, an aliphatic hydroxymonoamine such as triethanolamine, and formaldehyde. The new resins, which have molar ratios melamine:urea:hydroxyamine:formaldehyde in the range 1:0.25–8:0.1–2.5:4–30, have a faster curing rate and better stability in the liquid state for a given content of formaldehyde.

10 Claims, No Drawings

MODIFIED MELAMINE-FORMALDEHYDE CONDENSATION PRODUCTS

This invention relates to the preparation of melamine-formaldehyde condensation products, and particularly such products as are modified with aliphatic hydroxymonoamines.

Examples of such modified melamine-formaldehyde condensation products are disclosed in the specifications of our UK Pat. Nos. 1,305,187 and 1,317,774.

There are described in Specification No. 1,305,187 certain cationic water-soluble melamine-formaldehyde resins modified with an aliphatic hydroxymonoamine which are specially useful for imparting wet-strength to paper. These resins are obtainable by a two-stage process carried out in aqueous medium, both stages being operated with control of pH. In the process, the molar ratio melamine:formaldehyde employed is in the range 1:2–1:6 and the solids content of the system is at least 60% by weight. By this we mean that weight of reactants/(weight of reactants + aqueous medium) is at least 60%.

In Specification No. 1,317,774 there are described certain cationic water-soluble melamine-formaldehyde resins modified with an aliphatic hydroxymonoamine which are different from those of Specification No. 1,305,187 in being 'high formaldehyde' resins (they have a molar ratio formaldehyde:melamine greater than 6:1). These resins are useful in anchoring moisture-proof coatings to regenerated cellulose film.

The aliphatic hydroxymonoamine employed informing the resins described above are of the general formula $R_1R_2N—R—OH$ where R is lower alkylene (preferably $(CH_2)_2$ or $(CH_2)_3$)

$R_1$ is hydrogen, a lower alkyl group (preferably $CH_3$ or $C_2H_5$) or a hydroxy lower alkyl group (preferably $(CH_2)_2OH$ or $(CH_2)_3OH$), and $R_2$ is a lower alkyl group (preferably $CH_3$ or $C_2H_5$) or a hydroxy lower alkyl group (preferably $(CH_2)_2OH$ or $(CH_2)_3OH$).

Examples of such aliphatic hydroxymonoamines are: triethanolamine, tri-n-propanolamine, diethylaminoethanol and dimethylaminoethanol.

We have now found that, by substituting urea for part of the melamine employed in the production of hydroxymonoamine-modified melamine-formaldehyde resins, there can be obtained new resins of faster curing rate and improved stability in the liquid state for a given content of formaldehyde. Additionally, when employed so as to modify the kind of resin described in UK Specification No. 1,305,187, the substitution results in resins which develop wet strength in paper relatively quickly at ordinary temperature and humidity, a property which is specially useful when manufacturing tissue and towelling on high speed machines.

The new resins are condensates of melamine, urea, an aliphatic hydroxymonoamine and formaldehyde in the following molar proportions:

| Melamine | Urea | Hydroxy-monoamine | Formaldehyde |
|---|---|---|---|
| 1 | 0.25–8 | 0.1–2.5 | 4–30 |

and with a molar ratio formaldehyde: each amino-hydrogen atom in the range 0.5–2.25:1. (Melamine, $C_3N_3(NH_2)_3$ has 6 amino-hydrogen atoms; and urea, $CO(NH_2)_2$, has 4 amino-hydrogen atoms.)

In preparing resins suitable for use in paper treatment, the molar ratio melamine:formaldehyde employed is in the range 1:4–24, with a molar ratio formaldehyde: each amino-hydrogen atom in the range 0.5–1.25:1. Preferred proportions for such resins are:

| Melamine | Urea | Hydroxy-monoamine | Formaldehyde |
|---|---|---|---|
| 1 | 1.5–3.5 | 0.5–2 | 10–15 |

In preparing resins of molar ratio formaldehyde: each amino-hydrogen atom in the range 1.25–2.25:1, preferred proportions of the constituent substances are:

| Melamine | Urea | Hydroxy-monoamine | Formaldehyde |
|---|---|---|---|
| 1 | 1.5–3.5 | 0.5–2 | 10–30, especially 16–28 |

Those resins having a molar ratio formaldehyde: each amino-hydrogen atom in the range 0.5–1.25:1 can be made starting from reaction products of an aliphatic hydroxymonoamine with formaldehyde, which are prepared as described in Specification 1,305,187: that is to say by reacting formaldehyde and hydroxymonoamine in aqueous medium, at a solids content of at least 60% by weight and at pH at least 8.5 (preferably 8.5–11), at a temperature in the range 80° C.-reflux temperature. Such a product is then reacted with melamine and urea, at least the final stage of the reaction being carried out at reduced pH in the range 6.5–8.5, and preferably 7–7.5. The pH can be reduced by addition of a suitable acid, for example sulphuric, hydrochloric, orthophosphoric, formic or toluene p-sulphonic. The reaction is carried out at a temperature in the range 60° C.-reflux temperature, and preferably at 85°–95° C., preferably until the viscosity of the system, measured at 30% solids, is 50–400 centipoise (=0.05–0.4 Pascal seconds) at 25° C. and preferably 100–200 centipoise (=0.1–0.2 Pa s). The reaction product can then be diluted with enough water to make it readily pourable at ambient temperature, and then cooled to that temperature. The pH can if necessary be adjusted by addition of acid- or hydroxymonoamine to a value in the range 6.5–7.5, and the product can be set aside for storage.

In the procedure just described, it is convenient to start with the hydroxymonoamine alone, using at that stage enough formaldehyde not only to react with the hydroxymonoamine but also to provide for the subsequent addition reactions with melamine and urea.

In alternative procedures, the melamine and urea can be included, together or separately, in the first stage with formaldehyde and amine, or can be used initially to produce a reaction product with formaldehyde before the hydroxymonoamine is introduced.

In making those resins having a molar ratio formaldehyde: each amino-hydrogen atom in the range 1.25–2.25:1, the procedure can follow generally that described for the resins of lower formaldehyde content, but there is no need to provide for a solids content of at least 60% by weight; and this is so whether the 'extra' formaldehyde is added at the first stage or (as in Example 6 later) at the last.

The invention is further illustrated by the following Examples, which relate to the preparation of storage-stable cationic resins miscible with water in all proportions at 25° C. Examples 1–5 relate to resins of free formaldehyde content not greater than 6% by weight at 30% solids concentration, and Example 6 to a high formaldehyde content resin, with free formaldehyde greater than 10% by weight at 50% solids concentration.

EXAMPLE 1

328.6 g (9.96 moles) of 91% formaldehyde, 204.6 g (2.45 moles) of 36% formalin and 344 g (2.07 moles) of 90% triethanolamine were charged to a reactor flask and the mixture (pH=10.5) was heated to 85° C. This temperature was maintained for 2 hours, and the mixture was then cooled to 50° C. 130.7 g (1.03 moles) of melamine, 130.7 g (2.17 moles) of urea and 312 g of water were then added and the temperature was raised to 60° C. At this point heating was stopped and the exothermic reaction in progress was allowed to subside. The mixture was then adjusted to pH 7.1 (glass electrode at 25° C.) by the addition of 70 ml of 90% formic acid and heating was restarted to maintain a temperature of 85°–90° C. until the viscosity had, as a result of the condensation reaction, risen to 8 Pa s (at 25° C.). 1100 g of water were then added (solids content was then 28.5%) and the resin was cooled immediately to 25° C. Its viscosity was 58.4 centipoise (0.06 Pa s) at 25° C.

EXAMPLES 2, 3 AND 4

The procedure of Example 1 was followed generally, but with the following differences in detail:

| Material added | Example 2 | Example 3 | Example 4 |
|---|---|---|---|
| 91% formaldehyde | No difference | No difference | 219.1g (6.64 moles) |
| 36% formaldehyde | No difference | No difference | 136.4g (1.63 moles) |
| 90% triethanolamine | 258g (1.56 moles) | 86g (0.52 moles) | No difference |
| Water added with melamine & urea | 280g | 213g | 300g |
| 90% formic acid | 52.5ml | 18ml | 18ml |
| Final water addition | 888g | 730.6g | 840.5g |

EXAMPLE 5

316.8 g (9.6 moles) of 91% formaldehyde, 197.2 g (2.36 moles) of 36% formaldehyde and 82.9 g (0.5 moles) of 90% triethanolamine were charged to a reactor flask and heated at 85°–90° C. for 2 hours. After cooling to 50° C., 63 g (0.5 moles) of melamine, 216 g (3.6 moles) of urea and 220.8 g of water were added and the mixture was heated to 60° C. When the exothermic reaction had subsided, the mixture was brought to pH 7 by addition of 18 ml of 90% formic acid. The mixture was heated at 85°–90° C. and, when its viscosity (measured at 25° C.) had risen to 8 Pa s, water (731.2 g) was added. The syrupy resin was finally cooled to room temperature.

EXAMPLE 6

1000 g (12 moles) of 36% formaldehyde and 332 g (2 moles) of 90% triethanolamine were charged to a reactor flask and heated at 85°–90° C. for 2 hours. After cooling to 50° C., 126 g (1 mole) of melamine and 126 g (2.1 moles) of urea were then added, and the mixture was heated to 60° C. When the exothermic-reaction had subsided, 60 ml of 90% formic acid were added to bring the syrup to pH 7.3. The mixture was heated at 85°–90° C. until the viscosity (measured at 25° C.) had risen to 2–4 Pa s, and 320 g of water were then added. Heating at 85°–90° C. was then continued until the viscosity (at 25° C.) reached 6 Pa s. 528 g (16 moles) of 91% formaldehyde were added, and heating at 85°–90° C. was continued (15 mins) until only a single liquid phase was present, and then for a further 15 minutes. The syrupy resin was rapidly cooled to 30° C. and then adjusted to pH 7 with 90% formic acid. Its solids content was 48.3% by weight.

Testing of Product

The resin prepared according to Example 1 was evaluated for wet-strength performance in comparison with a resin prepared identically except for the replacement of the urea by an equal weight of melamine. Hand sheets were prepared on a standard form of apparatus (British Pulp and Board Makers Association) using bleached sulphite pulp beaten to a freeness of 32° Schopper-Reigler. In each case the equivalent of 2 parts by weight of solid resin per 100 parts of bone-dry pulp was used, the pulp suspension and backwater system being adjusted to pH 5.5 with dilute hydrochloric acid. On the hand sheets so produced, some were cured at 85° C. and some were allowed to age naturally at 65° F. and 50% RH (relative humidity). Wet-strength values, expressed as breaking length (meters) of 15 mm wide strips, were:

| | Natural aging at 65° F. and 50% RH | | | Cure time at 85° C. | |
|---|---|---|---|---|---|
| | Direct from machine | 1 week | 2 weeks | 5 mins | 10 mins |
| Example 1 resin | 540 | 989 | 1217 | 993 | 1238 |
| 'All melamine' equivalent of Example 1 resin | 276 | 725 | 907 | 661 | 1224 |

These results show faster development of wet-strength with the use of the melamine-urea-hydroxyamine-formaldehyde condensate than with the use of the melamine-hydroxyamine-formaldehyde condensate.

I claim:

1. A method of making a cationic water-soluble melamine-urea-aliphatic hydroxymonoamine-formaldehyde resin comprising reacting formaldehyde and an aliphatic hydroxymonoamine at elevated temperature in an aqueous medium of pH at least 8.5 and of solids content at least 60% to obtain a first product which is an aliphatic hydroxymonoamine-formaldehyde condensate; and then reacting that condensate with melamine and urea at elevated temperature to obtain a final product, at least the final stage of the latter reaction being carried out at reduced pH in the range 6.5–8.5: the proportions of the various reactants employed being such as to produce a final product in which the molar ratios melamine:urea:aliphatic hydroxymonoamine:formaldehyde are 1:1.5–8.0:0.5–2.5:4–24, and the molar ratio formaldehyde: each amino-hydrogen atom is in the range 0.5–1.25:1.

2. A method according to claim 1, in which the molar ratios melamine:urea:aliphatic hydroxymonoamine:formaldehyde are 1:1.5–3.5:0.5–2:10–15.

3. A method according to claim 1, in which the aliphatic hydroxymonoamine is triethanolamine.

4. A method according to claim 1, in which the reduced pH employed in said final stage is in the range 7–7.5.

5. A method according to claim 1, in which the reaction with melamine and urea at pH in the range 6.5–8.5 is carried out until the viscosity of the system, measured at 30% solids content and 25° C., is in the range 0.05–0.4 Pascal seconds.

6. A method according to claim 5, in which said viscosity is in the range 0.1–0.2 Pascal seconds.

7. A method of making a cationic water-soluble melamine-urea-aliphatic hydroxymonoamine-formaldehyde resin comprising reacting formaldehyde and an aliphatic hydroxymonoamine at elevated temperature in an aqueous medium of pH at least 8.5 to obtain a first products which is an aliphatic hydroxymonoamine-formaldehyde condensate; and then reacting that condensate with melamine and urea at elevated temperature to obtain a second product which is a melamine-urea-aliphatic hydroxymonoamine-formaldehyde condensate, at least the final stage of the latter reaction being carried out at reduced pH in the range 6.5–8.5; and finally reacting said second product with further formaldehyde; the proportions of the various reactants employed being such as to produce a final product in which the molar ratios melamine:urea:hydroxymonoamine-formaldehyde are 1:1.5–3.5:0.5–2.5:10–30, and the molar ratio formaldehyde: each amino-hydrogen atom is in the range 1.25–2.25:1.

8. A method according to claim 7, in which the molar ratio melamine:formaldehyde is in the range 1:16–28.

9. A resin produced by the method of claim 1.

10. A resin produced by the method of claim 7.

* * * * *